United States Patent [19]

Rose

[11] 3,763,574

[45] Oct. 9, 1973

[54] EDUCATIONAL APPARATUS
[76] Inventor: Joel S. Rose, 14 Norman Place, Buffalo, N.Y.
[22] Filed: Mar. 24, 1972
[21] Appl. No.: 237,713

[52] U.S. Cl. .................................. 35/9 D, 35/48 R
[51] Int. Cl. ............................................ G09b 7/00
[58] Field of Search .................................... 35/9, 48

[56] References Cited
UNITED STATES PATENTS
3,579,857   5/1971   Lamberson ............................ 35/9 B
3,106,027   10/1963  Thelen .................................. 35/9 C
3,187,443   6/1965   Schure et al. ........................ 35/9 C
2,997,793   8/1961   Kelly .................................... 35/9 D OTHER PUBLICATIONS
IBM Technical Disclosure Bulletin, Vol. 10, No. 9 Feb. 1968 "Paper Forms and Fixtures for Self–Scoring Tests" pages 1366–1369.

Primary Examiner—Harland S. Skogquist
Assistant Examiner—J. H. Wolff
Attorney—Conrad Christel et al.

[57] ABSTRACT

A set or assortment of cards bears question material, together with multiple choice answers. The card is placed face up on a surface containing closely spaced opposed conductors of an electric signalling circuit. At the rear of the card there is a recess in registry with the correct answer and containing an electrically conductive bottom wall, so that the electrically conductive material is normally spaced above the electrical conductors. When an answerer presses his finger upon a correct answer the electrically conductive bottom wall of the recess is pressed against opposed electrical conductors to close an audible or visual indicating circuit.

4 Claims, 4 Drawing Figures

PATENTED OCT 9 1973 3,763,574
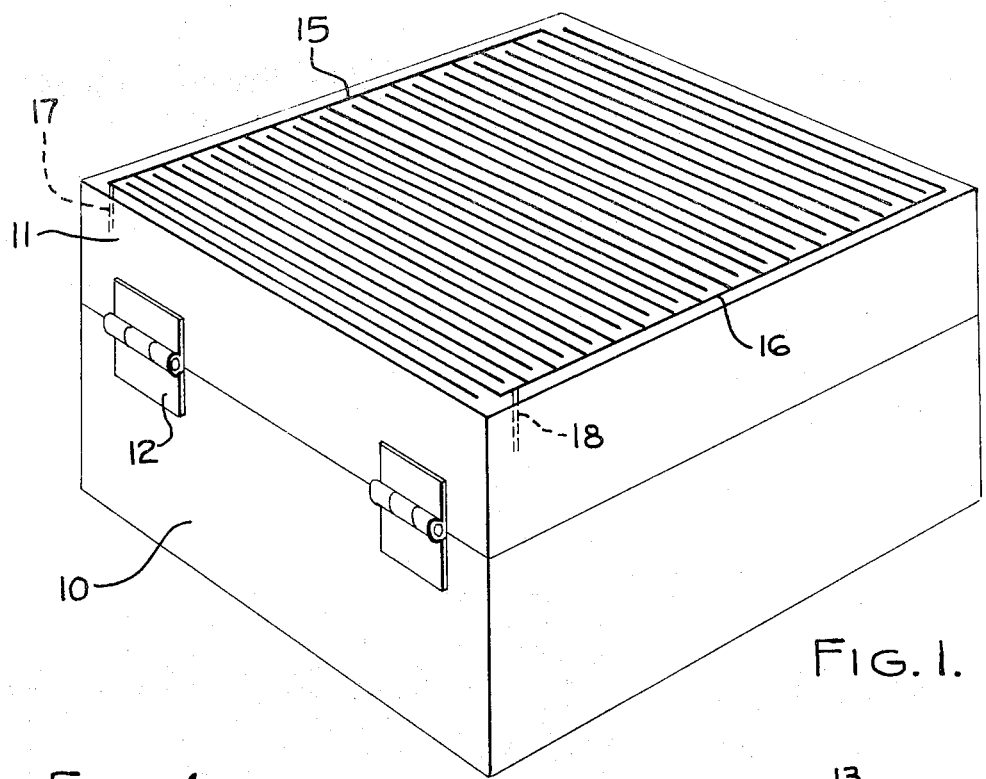
FIG. 1.
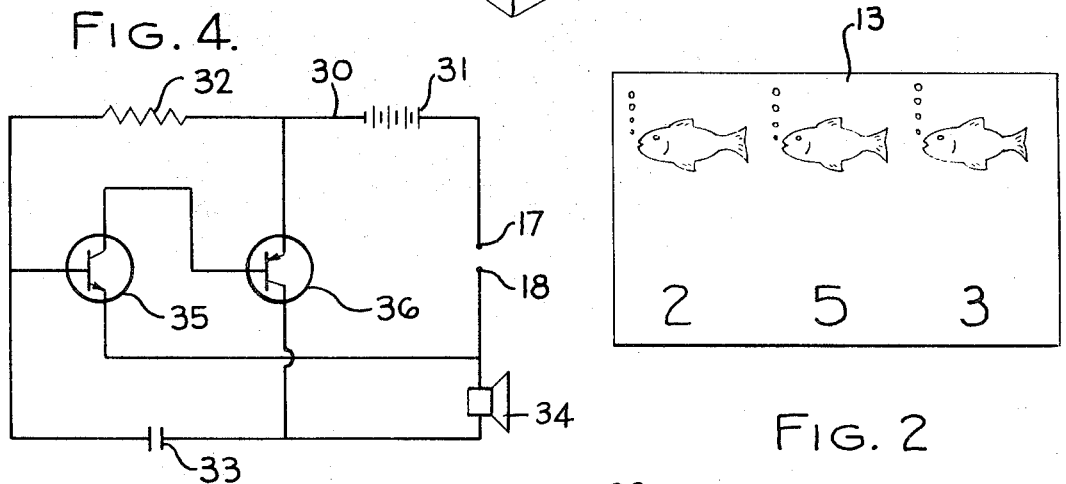
FIG. 4.
FIG. 2
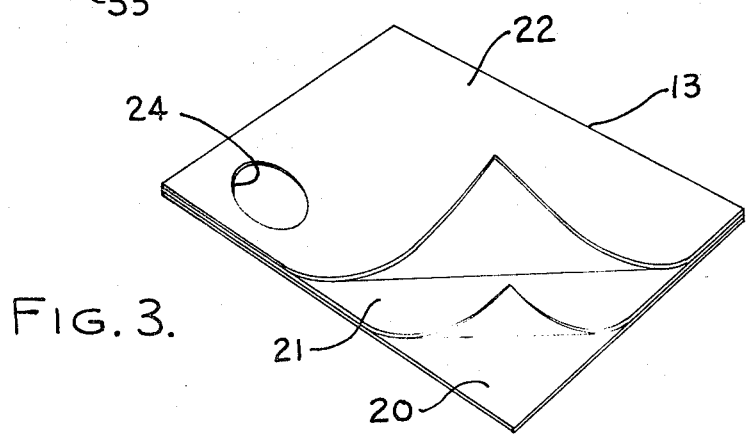
FIG. 3.

EDUCATIONAL APPARATUS

BACKGROUND OF THE INVENTION

This invention relates to a question and answer apparatus involving, essentially, a series of cards containing indicia including multiple choice answers and an electrical grid surface upon which the card is placed, whereupon the examinee presses his finger on the answer of his choice and electrical signal means associated with the electrical grid surface indicate a correct answer by an audible or visual signal.

Various apparatuses have been proposed wherein cards bear questions and multiple choice answers and wherein the card is placed in a mechanism and the person being examined presses keys or the like on the apparatus in accordance with the answer chosen and the apparatus records the correctness of the choice. Sometimes these cards contain notches or perforations for cooperation with the push button answering mechanism.

In any event, devices of this type in the prior art have been fairly complex and the nature of the mechanism which cooperates with the card is usually such that the range of answers is limited. Sometimes the answers must be numerical, at other times alphabetical, and so on.

SUMMARY OF THE INVENTION

The present invention provides an extremely simple apparatus wherein each of a set or assortment of cards bears question material or material in the nature of question material, together with multiple answers which need not be numerical or alphabetical or of any other set form. The questionee merely places the card on a surface containing closely spaced opposed conductors of an electric signalling circuit. At the rear of the card there is a recess containing an electrically conductive bottom wall so arranged that when an answerer presses his finger upon an answer, if the correct answer is chosen, the electrically conductive member is pressed against opposed electrical conductors to close an audible or visual indicating circuit.

Since the questions and answers on any given card are entirely complete in themselves, and require no extraneous push button or similar mechanism, the range of possible questions is virtually unlimited. Also, the procedure in placing the card and selecting the answer is so simple and rudimentary that very young children can easily operate the same.

BRIEF DESCRIPTION OF THE DRAWING

FIG. 1 is a perspective view of a box which comprises a principal component in one form of the present invention;

FIG. 2 is an elevational view of a card element which is one of a number of cards which form the other principal component of the present invention;

FIG. 3 is a perspective view of the reverse side of the card of FIG. 2 showing the laminated construction thereof; and FIG. 4 is a circuit diagram of indicating means employed in one form of the invention.

DESCRIPTION OF THE ILLUSTRATED EMBODIMENT

In FIG. 1 the numeral 10 designates a box similar to a conventional card file box having a cover 11 hinged thereto as at 12. The box is adapted to contain a series of cards similar to the card designated 13 in FIG. 2.

The upper surface of the cover 11 of box 10 has thereon a pair of electrical contact formations 15 and 16. The upper surface of the cover 11 of the box is of electrically non-conductive material such as plastic or the like and the contact formations 15 and 16 are super-imposed thereon. These formations may be formed by applying a thin layer of copper or the like to the upper surface of cover 11 and etching the copper after masking the desired portions. The formations may be provided in other ways as by electrodeposition or the like.

Each of the formations 15 and 16 is comb-like in formation with their multiple projections interfitting as clearly shown in FIG. 1. Conductors 17 and 18 lead downwardly into cover member 11 and connect the formations 15 and 16 into the electrical circuit shown in FIG. 4, as indicated at 17 and 18 in that figure. The projections of the conductive formations 15 and 16 extend closely adjacent to each other so that bridging any two of the adjacent formations with an electrical conductor closes the electric circuit shown in FIG. 4 which, as will be described later herein, establishes an audible or visual indicating circuit.

A wide variety of question and answer cards such as the one designated 13 in FIG. 2 may be provided. These may be furnished in groups aimed at various age classifications or various subject matters. The card shown at 13 in FIG. 1 shows three fishes and is obviously aimed at a very young child. The multiple choice answers shown along the bottom of the card are provided so that the child using the device may select the correct answer, in the illustrated case obviously the answer "3".

In using the device, card 13 is placed on the top 11 of the box in any random orientation. When the child makes a choice of the multiple answers it presses its finger against the selected answer. If the correct answer is chosen this closes the electric indicating circuit at 17, 18.

To achieve this end card 13 in the illustrated form consists of the three-ply structure clearly shown in FIG. 3. The front face comprises a cardboard member 20, the middle lamination is a metal foil sheet 21, and the rear face is again a cardboard member 22. The three laminations are adhesively attached to each other and an opening 24 is formed in the rear member 22 in registry with the correct answer at the front of the card, in this case behind the numeral 3.

The thickness of the rear cardboard member 22 normally maintains the metal foil 21 in the opening 24 out of contact with the electrical grid 15, 16, when the card is lying on top of the box. However, when the child presses its finger against the correct answer, in the present example the numeral 3, the foil 21 is pressed against at least two adjacent tooth formations of the grid 15,16 to close the indicating circuit and indicate that a correct answer has been chosen.

The electrical components forming the indicating circuit shown diagrammatically in FIG. 4 may be housed within the upper portion of cover 11 or may, if desired, be beneath a false bottom in the lower portion of box 10. In the latter case the conductors 17 and 18 will extend down along the inside of the rear wall of cover 11 and box 10 to the electrical circuitry.

Various indicating circuits may be employed. In the circuit shown in FIG. 4 by way of example, a transistor oscillator circuit 30 which contains the terminals 17 and 18 which lead to the grid formations 15, 16 contains a battery 31, a resistance 32, a condenser 33, and an electrically energized sounding device 34. Transistors 35 and 36 are connected across the circuit 30 as illustrated. This circuit is not novel to the present invention and is well understood by those skilled in the electronic arts. If desired, a lamp may be employed to give a visual signal either instead of or in addition to the sounding device 34. Obviously if a lamp is employed it will be displayed at the exterior of the box or cover member.

Obviously a wide variety of questions or illustrations similar to the three fishes of FIG. 2 may be set forth along the upper portion of a card with multiple choice answers therebelow. In some instances there may be more than one correct answer in which case there will be more than one opening 24 in the rear face 22 of card 13 in registry with the correct answers.

It will be seen from the foregoing that the nature of the questions and answers which may appear on a given card is virtually unlimited. In the illustrated instance the question is numerical but it may be alphabetical or of any other form. For instance, a given animal may be pictured at the top of the card and then in the multiple choice answer portion several animals may be pictured including the one at the top of the card. In such case the opening at the rear of the card indicating the correct answer will be behind the animal in the multiple choice row which corresponds to the animal at the top of the card.

Since the electric grid surface and the associated signal circuit will operate with cards containing questions and answers in virtually unlimited range, various sets of cards containing questions in different classifications of knowledge or for different age groups may be provided.

A preferred embodiment has been described herein and shown in the accompanying drawings to illustrate the underlying principles of the invention but it is to be understood that numerous modifications may be made without departing from the broad spirit and scope of the invention.

With the illustrated transistor oscillator circuit 30 the voltage is so low as to eliminate any danger of electrical shock or other harm to a child and it is desirable that any alternative structure be of low enough potential to retain this safety feature. If in certain instances a more powerful signal is desired, a relay may be interposed between the external contacts 15, 16 and the ultimate electric signalling device so that a higher voltage may be used to energize the indicating device while still employing low voltage external electrodes.

I claim:

1. In an educational device of the question and answer type, in combination, a surface having a multiplicity of closely spaced electrical conductors with alternate conductors comprising opposed terminals in an electrical indicating circuit, an answer card element bearing at its front face indicia in the nature of a series of multiple choice answers, said card comprising at least three laminations, the front and rear laminations comprising electrically non-conductive material and an intermediate lamination comprising electrically conductive material, said rear lamination having a perforation therethrough in registry with a correct answer at the front face of said card, whereby when the card is placed face up on said surface in any random position said conductive lamination is spaced above said conductors by said rear lamination but when a finger is pressed on the correct answer said conductive lamination is pressed against at least two adjacent conductors to close said indicating circuit.

2. Apparatus according to claim 1 including a container with said surface comprising the top surface of said container, said electrical indicating circuit being housed in said container and the latter being adapted to contain an assortment of said card elements.

3. Apparatus according to claim 1 wherein the front face of said card element bears indicia posing a question related to said multiple choice answers.

4. Apparatus according to claim 1 wherein said indicating circuit includes a sounding device activated upon closure of said circuit across said alternate conductors.

* * * * *